US008451437B2

(12) United States Patent
White

(10) Patent No.: US 8,451,437 B2
(45) Date of Patent: May 28, 2013

(54) ELECTROLUMINESCENT LIGHT OUTPUT SENSING FOR VARIATION DETECTION

(75) Inventor: Christopher J. White, Avon, NY (US)

(73) Assignee: Global OLED Technology LLC, Herndon, VA (US)

( * ) Notice: Subject to any disclaimer, the term of this patent is extended or adjusted under 35 U.S.C. 154(b) by 185 days.

(21) Appl. No.: 13/029,684

(22) Filed: Feb. 17, 2011

(65) Prior Publication Data

US 2012/0212730 A1 Aug. 23, 2012

(51) Int. Cl.
*G01J 1/10* (2006.01)

(52) U.S. Cl.
USPC .......... 356/229

(58) Field of Classification Search
USPC .......... 356/229
See application file for complete search history.

(56) References Cited

U.S. PATENT DOCUMENTS 7,573,209 B2 8/2009 Ashdown et al.
7,573,210 B2 8/2009 Ashdown et al.
2002/0176458 A1* 11/2002 O'Connor .......... 372/29.02
2002/0190661 A1 12/2002 Duggal et al.
2003/0230991 A1 12/2003 Muthu et al.
2004/0099786 A1* 5/2004 Su et al. .......... 250/201.1
2006/0245174 A1 11/2006 Ashdown et al.
2008/0158178 A1 7/2008 Hotelling et al.

OTHER PUBLICATIONS

Simpson, "Lighting Control—Technology and Applications", Oxford, Focal Press, pp. 418-419, 2003.

* cited by examiner

*Primary Examiner* — Tu Nguyen
(74) *Attorney, Agent, or Firm* — Global OLED Technology LLC

(57) ABSTRACT

An apparatus for detecting variations in light output of an electroluminescent (EL) device is described. The EL device includes a transparent substrate having a first edge extending in a first direction and a plurality of EL emitters disposed over the face of the substrate in the first direction, and some of the light emitted by each EL emitter travels through the substrate and out of the first edge. A light sensor physically separated from the first edge senses the light travelling out of the first edge. A controller stored first sensed light at a first time and second sensed light at a later second time and computes a variation in light output of one or more of the EL emitters in the EL device using the stored first sensed light and second sensed light.

9 Claims, 11 Drawing Sheets

ELECTROLUMINESCENT LIGHT OUTPUT SENSING FOR VARIATION DETECTION

FIELD OF THE INVENTION

This invention pertains to the field of electroluminescent devices and more particularly to detection of variations in the output of electroluminescent devices over time.

BACKGROUND OF THE INVENTION

Electroluminescent (EL) devices such as Organic Light Emitting Diodes (OLEDs) are a promising technology for flat-panel displays and lamps or illumination sources. EL devices can be formed as large, solid state devices that provide uniform light output over larger areas with a high efficiency and excellent color rendering. Further, these devices are thin, consume relatively small amounts of materials, and do not include materials that are known to be harmful to the environment. Each of these attributes is highly desirable for a display or lamp.

EL displays are typically passive- or active-matrix structures with EL emitters arranged in a two-dimensional array. Large area coatable EL lamps, such as OLED lamps, can be formed to include multiple OLEDs or other EL light-emitting elements on a single substrate wherein these OLEDs are connected in series to create a high voltage lamp. Groups of series-connected EL emitters can be themselves connected in parallel, the EL emitters being laid out in a two-dimensional array.

In lamps using these serial connections, the individual serially-connected EL elements are typically small, as several EL elements are connected in series to form high voltage lamps that support electrical potentials near the electrical potentials used in the power distribution infrastructure. Further, because a short in an EL element will dim, if not disable, an entire EL element, it is desirable to provide small EL elements to avoid large dim or dark spots within the lamp due to shorts. However, shorts can occur over the life of a lamp. Similarly, individual EL emitters in a lamp or EL display can dim over time as they are used, even if no shorts occur. There is a need, therefore, for ways to detect dimming and shorts over the life of an EL device.

Ashdown et al., in U.S. Pat. No. 7,573,210 and U.S. Pat. No. 7,573,209, describe schemes for feedback and control of a luminaire with one or more LED lamps, including light sensors for detecting the light emitted by the lamps and a control system for adjusting the current to one or more of the lamps to maintain the light output at a desired value. However, these schemes do not recognize the problems of short detection, reporting to a central monitoring system such as a building management system, or placing the light sensors so that they do not obstruct the light reaching a user.

Muthu et al., in U.S. Patent Application Publication No. 2003/0230991, describe an LED backlight unit (BLU) including photodiodes for measuring the luminosity of the light in a light guide and a control circuit for maintaining the color and luminosity of the BLU. However, this scheme affixes the photodiodes directly to the light guide, making the BLU an expensive, integrated unit that must be entirely replaced if any part fails. Furthermore, this scheme is adapted to an edge-illuminated light guide that has the same luminosity and color throughout and cannot detect the spatial locations of failures of individual emitters, such as are found in EL devices illuminated by EL emitters located on the face of a substrate rather than the edge.

There is a continuing need, therefore, to detect variations and failures in the light output of a face-illuminated EL device without obstructing the light path to the user or making the measurement electronics part of an expensive, difficult-to-replace component.

SUMMARY OF THE INVENTION

According to the present invention, there is provided apparatus for detecting variations in light output of an electroluminescent (EL) device, comprising:

a) the EL device, including:

i) a transparent substrate having a first edge extending in a first direction, and a face; and ii) a plurality of EL emitters disposed over the face of the substrate in the first direction;

b) a power supply for providing electric current through the EL emitters so that they emit light, wherein some of the light emitted by each EL emitter travels through the substrate and out of the first edge;

c) a light sensor for sensing the light travelling out of the first edge, wherein the light sensor is physically separated from the first edge; and d) a controller for storing first sensed light at a first time and second sensed light at a later second time and computing a variation in light output of one or more of the EL emitters in the EL device using the stored first sensed light and second sensed light.

This invention provides a simple way to measure the output of an EL device without obstructing the light path from the EL device to a user. It decouples the measurement electronics from the substrate of the EL device to permit easy, low-cost replacement of defective or failed EL devices. It can further detect the spatial location of a failure on an EL device with multiple EL emitters. It uses total internal reflection to provide sensor data having reduced crosstalk between multiple adjacent EL emitters. It is useful with a wide range of substrates, including glass and plastic. By physically separating the light sensor from the substrate, the present invention requires no changes to the EL device, so existing EL devices can readily be employed with the present invention.

It is to be understood that the attached drawings are for purposes of illustrating the invention and may not be to scale.

DETAILED DESCRIPTION OF THE INVENTION

Figure 1A:
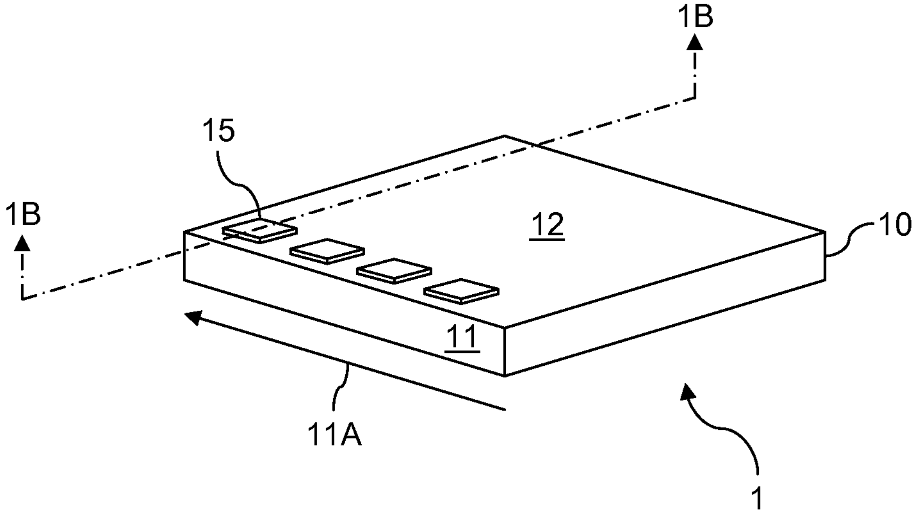
FIG. 1A is an isometric view of an electroluminescent (EL) device according to an embodiment.

FIG. 1A shows an electroluminescent (EL) device 1 including a transparent substrate 10 having a first edge 11 extending in a first direction 11A, and a face 12. The first direction 11A is a vector oriented substantially parallel to first edge 11. For example, first direction 11A can be defined as a vector from the midpoint of the corner of substrate 10 and one end of first edge 11 to the midpoint of the corner of substrate 10 at the other end of first edge 11. A plurality of EL emitters 15 is disposed over the face 12 of the substrate 10 in the first direction 11A. That is, a line through the center of each EL element 15 is within +/−10 degrees of first direction 11A. Each EL emitter 15 can be an organic light-emitting diode (OLED), quantum-dot emitter, or other EL structure known in the art. When electric current passes through an EL emitter 15, it emits light. In this application, "light", when referring to pixel information, includes electromagnetic radiation in the near-infrared, visible, and near-ultraviolet regions of the electromagnetic spectrum (approximately 300 THz-900 THz). EL device 1 can be an EL display (e.g. an active-matrix display or AMOLED) or a solid-state light (SSL).

Figure 1B:
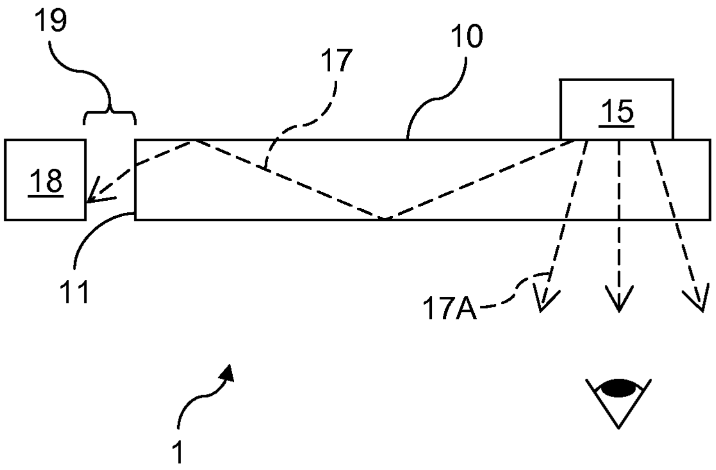
FIG. 1B is a cross-section of the EL device of FIG. 1A, shown with related components.

FIG. 1B shows a cross-section of the EL device of FIG. 1A along the line marked "1B," and related components. Substrate 10 with first edge 11 and EL emitter 15 disposed thereover are as shown in FIG. 1A. EL emitter 15 emits light in a variety of directions. Some of the light emitted is user light 17A, which travels through the substrate 10 and to the user of the EL device, e.g. the viewer of a display or occupant of an office illuminated by the apparatus. Some of the light emitted is emitted light 17, which travels through substrate 10, e.g. by total internal reflection, out of first edge 11, across gap 19, to light sensor 18.

Figure 1C:
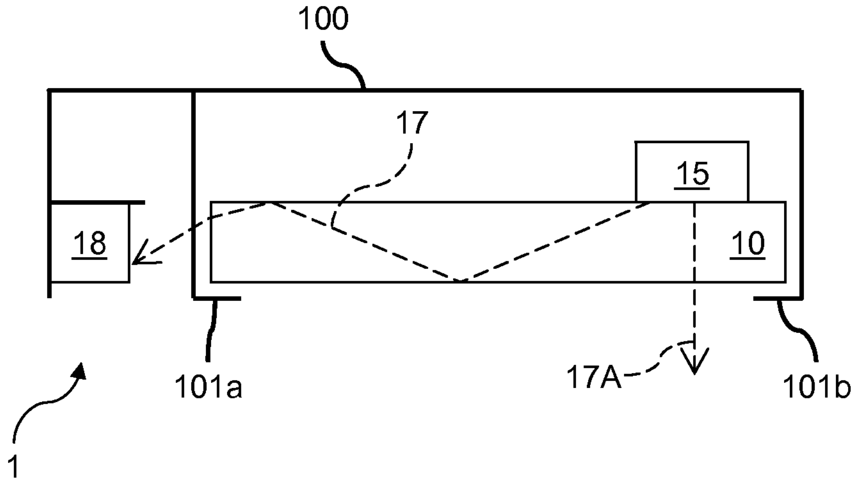
FIG. 1C is a side view of a fixture according to an embodiment.

FIG. 1C shows a fixture 100 for mechanically holding substrate 10 and light sensor 18 in place with respect to each other, and for keeping substrate 10 and light sensor 18 physically separated. EL emitter 15 and user light 17A are as described above. Fixture 100 can be a luminaire for holding the EL device such as a solid-state light. In one embodiment (shown), light sensor 18 can be semi-permanently attached to fixture 100 (e.g. bolted or screwed), and substrate 10 can be removably attached to fixture 100 (e.g. slid into, or attached using a ZIF socket). This permits substrate 10 to be replaced without disturbing or affecting light sensor 18. Note that "semi-permanently attached" in this context means that the component is not trivial to detach, not that the component can never be detached or is a fixed integral part of the fixture. In one embodiment, removably-attached substrate 10 is detachable from fixture 100 by a maintenance technician, but semi-permanently-attached light sensor 18 requires special tools or engineering training to detach. Fixture 100 does not block the passage of emitted light 17 to light sensor 18 in appropriate areas of substrate 10.

In one embodiment, when one or more EL emitters 15 on substrate 10 fail, substrate 10 can be removed from the fixture and replaced with a different replacement substrate without needing to detach light sensor 18 from substrate 10 and attach it to the replacement substrate. This reduces the labor cost of replacement, and reduces the cost of substrate 10 by reducing the component count of substrate 10 (e.g. no light sensors 18 need to be replaced with the substrate 10). In FIG. 1C, fixture 100 includes two edge supports 101*a*, 101*b* for providing the removable attachment. Substrate 10 rests on edge supports 101*a*, 101*b* and can be readily lifted off of them. Edge supports 101*a* can include one or more apertures (e.g., holes, slits, or irises) through which emitted light 17 passes to light sensor 18.

Figure 4:
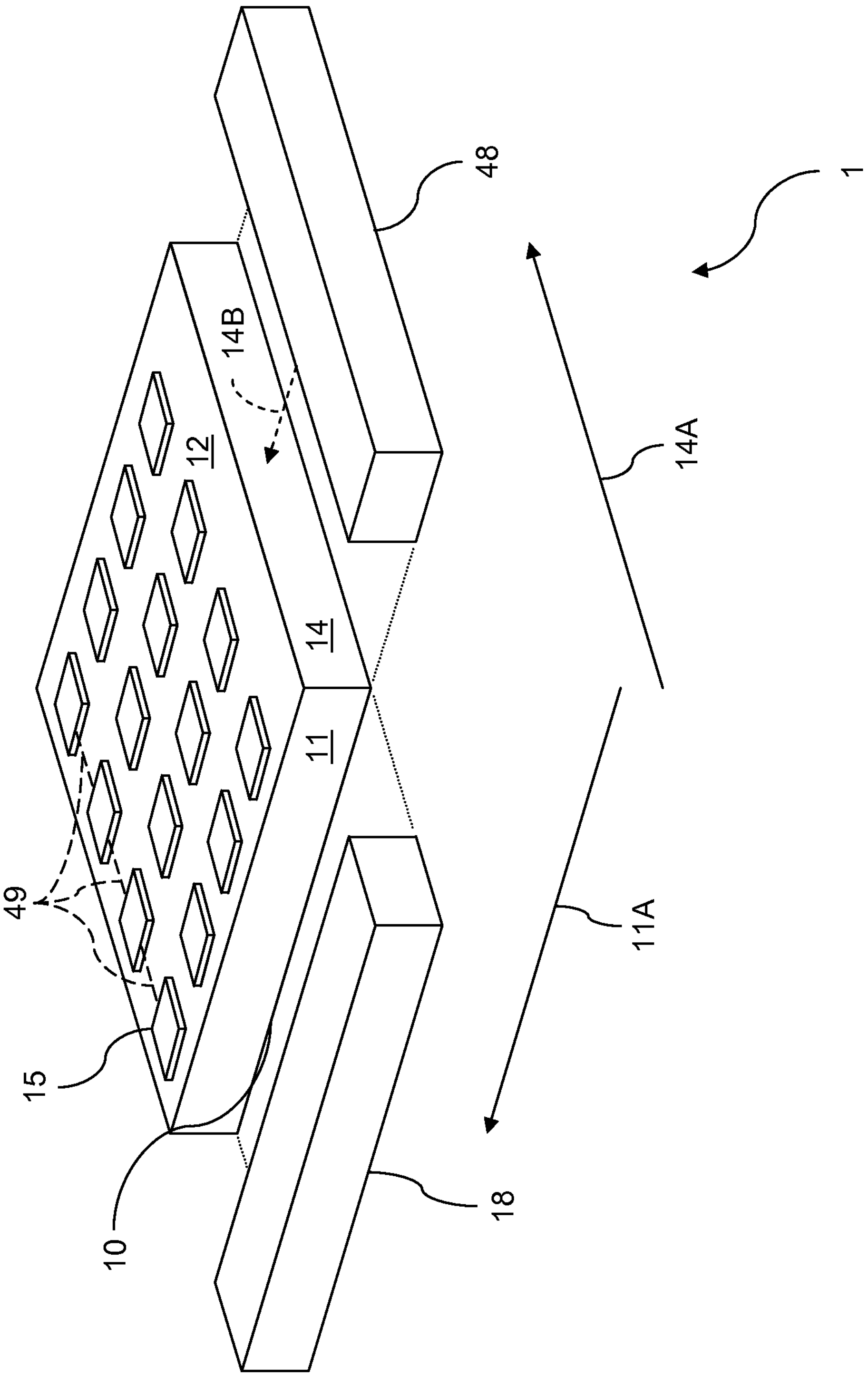
FIG. 4 is an isometric view of an electroluminescent (EL) device according to an embodiment.

Referring to FIG. 4, light sensor 18 is preferably a linear sensor, and can be e.g. a linear CCD array or linear CMOS sensor as known in the art. When light sensor 18 is a linear sensor, its long axis is preferably oriented within ±10° of roll of the first direction, the roll axis being a selected axis normal to the light-sensitive surface of light sensor 18. This permits light sensor 18 to image all or a substantial portion of first edge 11. Light sensor 18 can include one or more independent sensing areas (pixels), each of which can have narrow- or broad-wavelength-band response, and each of which can be covered with an optional color filter. Light sensor 18 can also comprise one or more discrete photodiodes, preferably arranged in a line parallel to first direction 11A.

Referring back to FIG. 1B, Light sensor 18 senses the emitted light 17 travelling out of first edge 11. Light sensor 18 is not in direct contact with first edge 11, and is physically separated from first edge 11. That is, there is a gap 19 between first edge 11 and light sensor 18 that is a vacuum, or that is filled with a material that cannot keep the light sensor 18 in position with respect to first edge 11. Gap 19 can be filled with air or an index-matching fluid, e.g., having a refractive index within 0.5 of the refractive index of substrate 10.

Substrate 10 is transparent. By "transparent" it is meant that an effective amount of emitted light 17 travels through the substrate 10 to meet the signal-to-noise requirement of the light sensor 18. As emitted light 17 travels through the substrate, it is attenuated as known in the art. Attenuation is measured in dB of optical power attenuation in a particular direction, per unit length. For example, typical optical fiber used for communications has an optical power attenuation of 3 dB/km at 850 nm.

In various embodiments, substrate 10 has an optical power attenuation from the EL emitter 15 farthest from light sensor 18 to light sensor 18 of less than 20 dB at one or more selected wavelength(s) present in the emitted light 17. That is, at least 1% of the optical power of emitted light 17 injected at one end of substrate 10 at the selected wavelength will reach first edge 11.

Figure 2A:
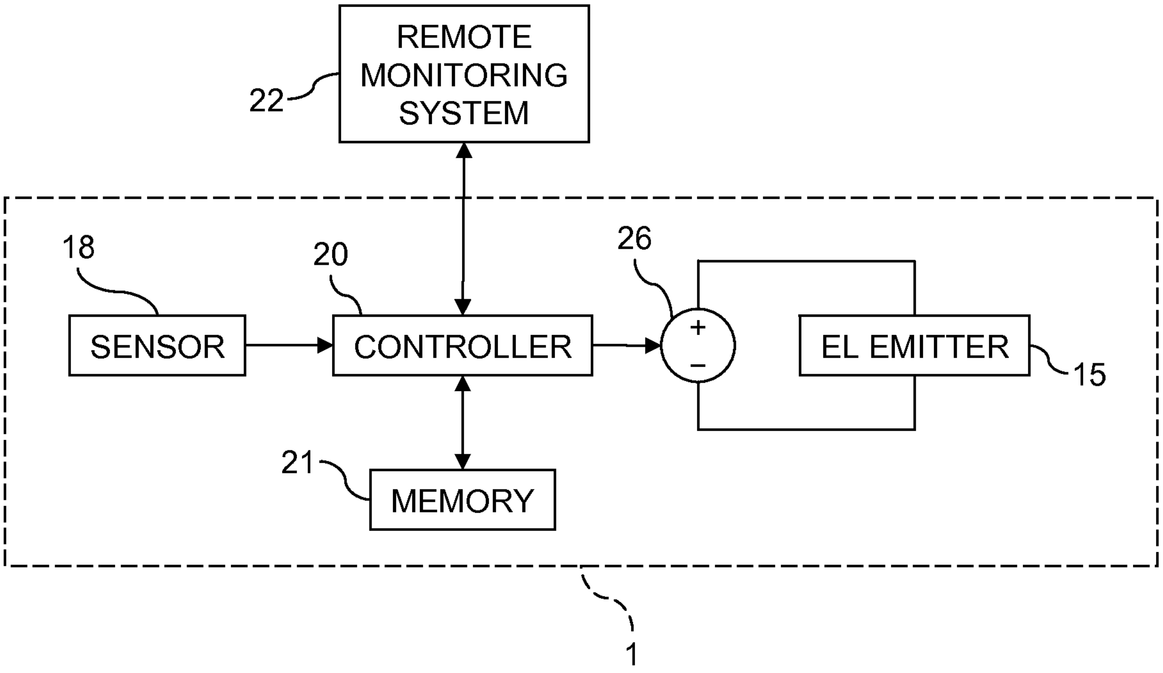
FIG. 2A is a block diagram of a system according to an embodiment.

FIG. 2A shows a block diagram of an apparatus for detecting variations in light output of EL device 1, and for compensating for the detected variations in light output. EL emitter 15 and light sensor 18 are as discussed above. Power supply 26 provides current to EL emitter 15 to cause it to emit light. Controller 20 receives measurements of sensed light from light sensor 18 and can also adjust the current provided by power supply 26 to compensate for variations in light output.

To detect variations in the light output of EL device 1, controller 20 receives a reading of first sensed light from light sensor 18 at a first time, e.g. before EL device 1 is placed into use. Controller 20 stores the first sensed light in memory 21, e.g. a Flash memory. At a second time later than the first time, e.g. after EL device 1 has been used for some number of hours; controller 20 receives a reading of second sensed light from light sensor 18 and stores it in memory 21. Controller 20 computes a variation in light output of one or more of the EL emitters in the EL device using the stored first sensed light and second sensed light.

Controller 20 can receive additional readings of sensed light at a time when no EL emitters 15 are emitting light, and use those additional readings to correct for flare due to ambient light or other stray light striking light sensor 18. For example, at a time just before the first time, the controller 20 can turn off all the EL emitters 15 and receive a reading of sensed flare light from light sensor 18. Controller 20 can subtract the sensed flare light from the first reading of first sensed light and store the difference in memory 21 as the first sensed light.

In one embodiment, controller 20 is connected to remote monitoring system 22, and communicates the computed variation to the remote monitoring system. For example, when controller 20 detects that one of the EL emitters 15 in EL device 1 has failed, controller 20 communicates that information to remote monitoring system 22. This permits remote monitoring system 22 to report the location of failures to maintenance personnel without requiring manual inspection of every luminaire in a building. A remote monitoring system 22 is any device for monitoring the operation of an EL device that is separate from the EL device or the fixture holding the EL device. For example, remote monitoring system 22 can be connected to controller 20 wirelessly, or by a readily-disconnected cable such as a Cat 5 Ethernet cable with RJ-45 modular plugs. Remote monitoring system 22 is discussed further below with respect to FIG. 6.

In another embodiment, controller 20 compensates for aging of one or more of the EL emitters 15 by adjusting the current provided by power supply 26. For example, when the second stored light is only 80% of the luminance of the first stored light, the controller 20 can infer that EL device 1 has lost 20% of its luminous efficacy. It can therefore increase the current provided by power supply 26 by 25% to return the light output of EL device 1 to its original level (0.8*1.25=1). Correspondingly, if the second stored light is higher than the first stored light, controller 20 can reduce the current provided by power supply 26.

Figure 2B:
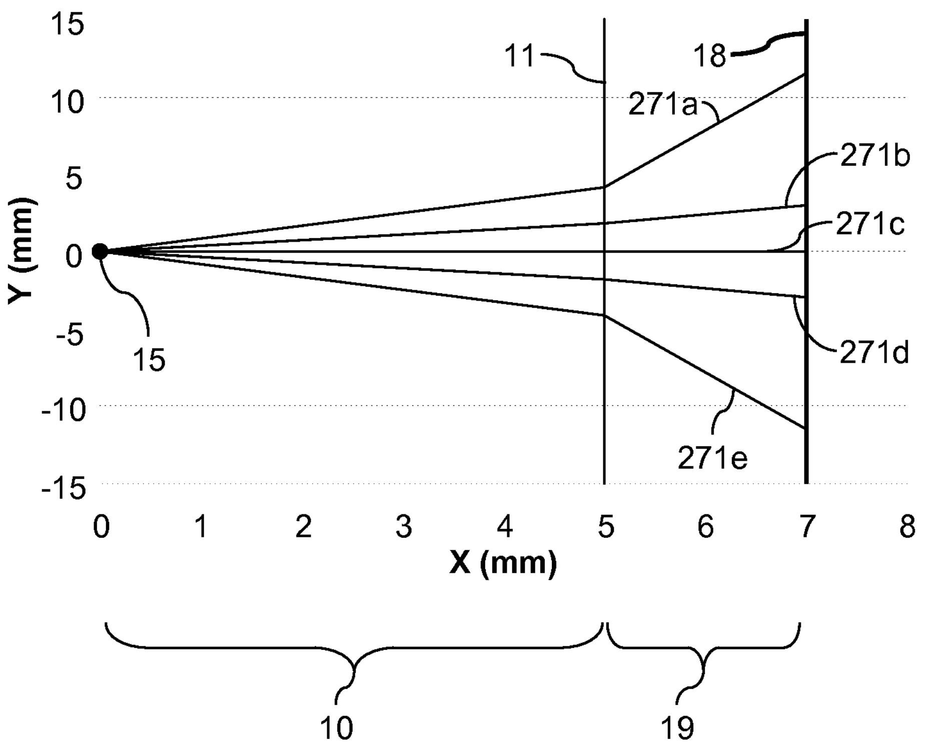
FIG. 2B is a simulated optical ray trace according to an embodiment.

FIG. 2B shows a simulation of light from an EL emitter 15 passing through first edge 11 and striking light sensor 18. This plot is a view from above or below the display. Although the plot is shown in mm for convenience, any distance unit can be used. The substrate is at distance X<=5 mm from emitter 15, first edge 11 is at X=5 mm, gap 19 is at 5 mm<X<7 mm, and light sensor 18, specifically the light-sensitive surface of light sensor 18, is at X=7 mm. EL emitter 15 is an isotropically-emitting point source, substrate 10 has a refractive index n=1.5, and gap 19 has a refractive index n=1.0. The critical angle for total internal reflection at first edge 11 from substrate 10 into gap 19 is therefore arcsin(1/1.5)=41.81°. That is, light more than 41.81° away from the normal to first edge 11 will not escape substrate 10. This fact advantageously reduces crosstalk between adjacent EL emitters 15, as will be discussed further below with reference to FIG. 2C. Light rays 271*a*, 271*b*, 271*c*, 271*d* and 271*e* are at angles of 40°, 20°, 0°, −20° and −40° with respect to the normal to first edge 11 projected through EL emitter 15. As the light rays pass through the edge to the gap (higher to lower refractive index), they diverge according to Snell's Law, as shown, and illuminate light sensor 18 over approximately ±11.5 mm from position Y=0, which is the projection of the normal to first edge 11 through EL emitter 15 and light sensor 18. Y is shown in mm for convenience, but any distance unit can be used.

Figure 2C:
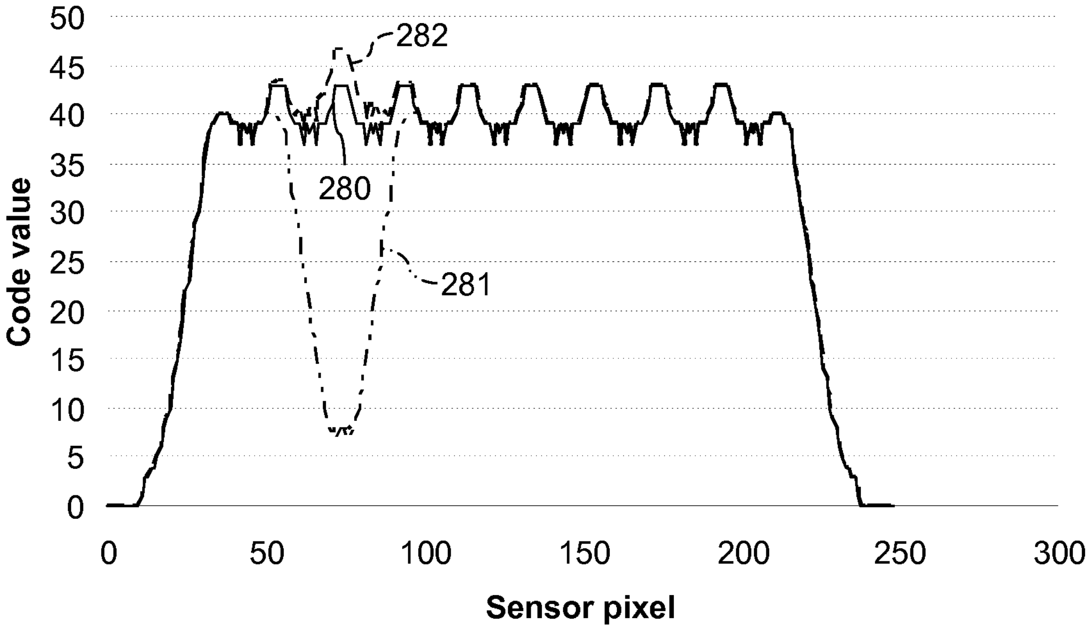
FIG. 2C is a plot of simulated light sensor data according to an embodiment.

FIG. 2C shows simulated light sensor data for ten EL emitters 15 of the configuration of FIG. 2B, located at Y=5, 15, . . . , 95 mm. Light sensor 18 is a linear sensor oriented parallel to first edge 11, with 0.5 mm-wide pixels and 100% fill factor. The abscissa is the pixel number, with pixel 0 having its center at Y=−12 mm. The ordinate is the code value, which is the number of rays striking the pixel. 801 rays were traced out of each EL emitter over the range ±40°.

Solid curve 280 shows the simulated light sensor data when all 10 EL emitters 15 are emitting equal amounts of light. Curve 280 is an example of a reading of first sensed light from light sensor 18 at a first time. The data of curve 280 have 10 peaks (local maxima) corresponding to the 10 EL emitters 15. Pixels between EL emitters 15 receive light from both of their adjacent EL emitters 15, so no pixel has a reading of 0 except at the very ends. However, as discussed above, the light from each EL emitter 15 only covers ±24 pixels (±11.5 mm) from the Y location of the EL emitter 15 due to total internal reflection. Therefore, EL emitters 15 are preferably spaced far enough apart that each pixel of light sensor 18 receives light from at most two EL emitters 15, and more preferably from exactly one EL emitter 15. However, this is not a requirement; in this example, the EL emitters 15 are spaced so that each pixel of light sensor 18 receives light from three EL emitters 15 (10 mm-pitch EL emitters with a ±11.5 mm light cone).

Dash-dot curve 281 shows the simulated light sensor data when the third EL emitter 15 (Y=25) has failed. Curve 281 is an example of a reading of second sensed light from light sensor 18 at a second time (as is curve 282, discussed below). The data for pixels around the center of the third EL emitter 15 (e.g. pixels 70-80) are very low, but are not zero because of the light from the second and fourth EL emitters 15 (Y=15, 35 respectively). Controller 20 compares first sensed light in curve 280 and second sensed light in curve 281, e.g. by subtracting curve 281 from curve 280. The resulting difference has a large magnitude for pixels receiving light from the third EL emitter 15 and a small magnitude for all other pixels. This indicates EL emitter 15 has failed.

Dashed curve 282 shows the simulated light sensor data when the third EL emitter 15 (Y=25) is emitting 10% higher than normal. Again, pixels 70-80 are most affected, and controller 20 inspects the magnitude of the difference of curve 280 and curve 282 to determine the location of a fault. This failure mode will be discussed further below with reference to FIG. 4.

Although FIGS. 2B and 2C represent EL emitters as isotropic point sources for purposes of explanation, typical EL emitters are isotropic area sources. Appropriate modifications to these calculations will be obvious to those skilled in the optical art. For example, the critical angle will apply across the width of the emitter, not just at a single point.

Figure 3A:
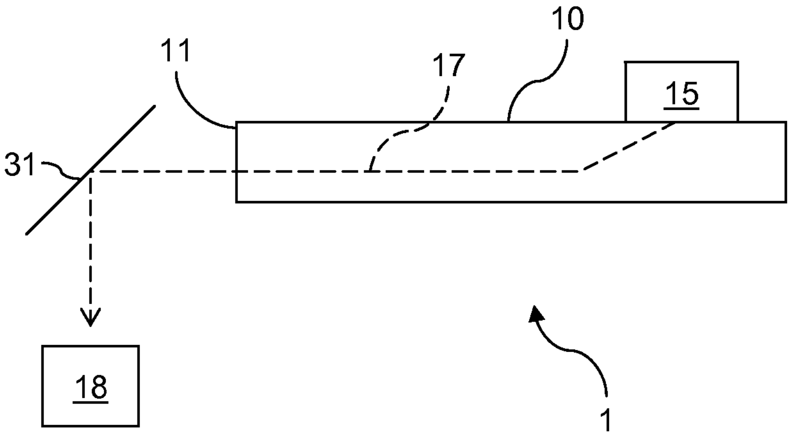
FIG. 3A is a side view of an EL device and mirror according to an embodiment.

FIG. 3A shows a side view of another embodiment. EL device 1 with substrate 10, EL emitter 15 and first edge 11 are as discussed above. Emitted light 17 travels out of first edge 11 and strikes a mirror 31 that reflects the emitted light 17 towards the light sensor 18, where it is sensed. Note that in this and subsequent figures, the internal reflections of emitted light 17 are omitted for clarity. This embodiment permits light sensor 18 to be placed where it will not obstruct light or increase the footprint of a fixture or luminaire holding substrate 10. A fixture or luminaire as discussed above can hold mirror 31 in place with respect to substrate 10 and light sensor 18. Light sensor 18 can be on the same side of substrate 10 as the user, or on the opposite side.

Figure 3B:
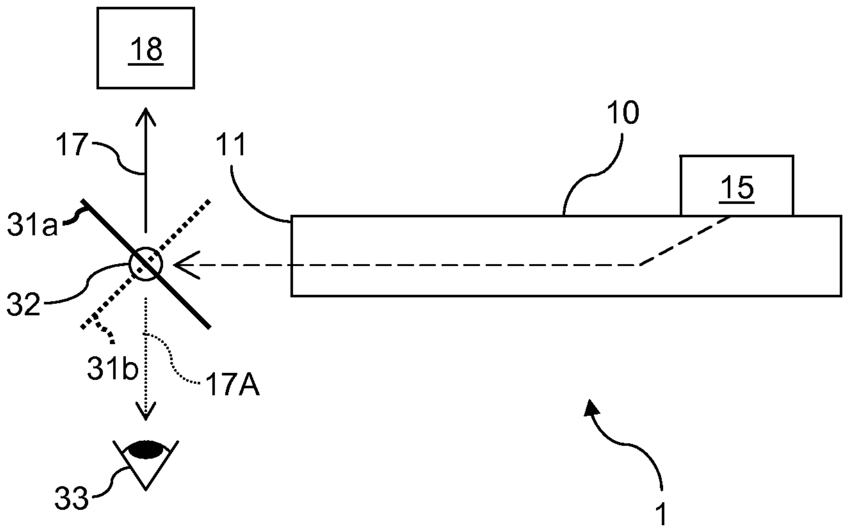
FIG. 3B is a side view of an EL device and moving mirror according to an embodiment.

Referring to FIG. 3B, there is shown a side view of another embodiment. EL device 1 with substrate 10 and EL emitter 15 are as discussed above. Mirror 31 (FIG. 3A) is moved or rotated by actuator 32, which can be a servomotor, galvanometer (galvo), stepper motor, piezo-driven linkage, or other actuator known in the art. When mirror 31 is in first mirror position 31*a*, light emitted by the EL emitter is reflected towards light sensor 18 as emitted light 17. When mirror 31 is in second mirror position 31*b*, light emitted by the EL emitter is reflected towards user 33 as user light 17A. This increases the overall efficiency of EL device 1 by using light travelling out of first edge 11 for sensing only when necessary, and providing that light to the user at all other times.

In yet another embodiment, a mirror as described above may be positioned so that light emitted from more than one EL emitter in the fixture is received by a single light sensor. It is also possible that a single moveable mirror or multiple mirrors are used so that light emitted from more than one EL emitter in the fixture is received by a single light sensor.

FIG. 4 shows an isometric view of an embodiment using two light sensors and a two-dimensional arrangement of EL emitters 15. In FIG. 4, fine dotted lines are used to clarify the perspective of the drawing and the arrangement of elements, and do not denote any structure. EL device 1 has substrate 10 as described above. Substrate 10 further includes a second edge 14 extending in a second direction 14A not parallel to the first direction 11A of first edge 11, e.g., perpendicular to first direction 11A. The plurality of EL emitters 15 is disposed over the face 12 of the substrate 10 in a repeating pattern in the first direction 11A and the second direction 14A. For example, the EL emitters 15 can be arranged in a regular rectangular grid pattern. Some of the light emitted by each EL emitter travels through the substrate 10 and out of the first edge 11 and some travels out of the second edge 14.

Light sensor 18 is as described above. EL device 1 further includes a second light sensor 48 for sensing the light travelling out of the second edge. The first and second light sensors (18, 48) are physically separated from the first and second edges (11, 14), respectively. When light sensor 48 is a linear sensor, its long axis is preferably oriented within +/−10 degrees of roll of second direction 14A, roll axis 14B being a selected axis normal to the light-sensitive surface of second light sensor 48 (one example shown). This permits second light sensor 48 to image all or a substantial portion of second edge 14.

Referring to FIG. 4 and also to FIG. 2A, controller 20 receives a reading of third sensed light from second light sensor 48 at a third time and stores the third sensed light in memory 21. The third time can different from the first time or preferably be the same as the first time. It is preferably a time before EL device 1 is put into use. The controller then receives a reading of fourth sensed light from second light sensor 48 at a fourth time that is later than the third time and stores the fourth sensed light in memory 21. The fourth time is later than the third time, and can be different from the second time or preferably be the same as the second time. Controller 20 then computes a variation in light output of one or more of the EL emitters in the EL device using the stored first through fourth sensed light.

Referring to FIG. 4 and also to FIG. 2C, curve 282 can indicate a failure by shorting of a single OLED in a two-dimensional pattern, e.g. as in OLED lighting. For example, FIG. 2 of U.S. Patent Application Publication No. 2002/0190661 to Duggal et al. shows an OLED module (analogous to EL device 1) having a plurality of groups of OLEDs arranged in parallel electrically, each group having a plurality of OLEDs arranged in series. When an individual OLED in such a module shorts closed, e.g. due to particulates making gaps in the OLED in which the anode and cathode of the OLED can directly contact each other, the voltage across that OLED drops to 0. The applied voltage across the group is constant, so the voltage across each non-shorted OLED in the group goes up. Therefore, the current through the group, and the light emitted by each OLED in the group, rises. Because each EL emitter 15 has a nonlinear current-voltage relationship, the total light output of a group can increase due to the shorting of one element.

If each row of EL emitters 15 arranged along second direction 14A is connected in series as a group, as shown by wires 49, a short in any EL emitter 15 in the group can increase the light output of the group, and thus the light received by light sensor 18 from that group. This is the case of curve 282 shown in FIG. 2C.

Still referring to FIGS. 4 and also 2C, controller 20 can use sensed light from light sensors 18 and 48 to detect the spatial location of a failure on an EL device 1 having multiple EL emitters 15. For example, if pixels 70-80 of second sensed light from light sensor 18 have high values (like curve 282), indicating a short somewhere in the third row of EL emitters 15, and pixels 150-160 of fourth sensed light from light sensor 48 have low values, indicating a shorted EL emitter 15 in the 7th column of EL emitters 15, controller 20 infers that a single failure is located in row 3, column 7 Controller 20 can report this to remote monitoring system 22 as a partial failure, rather than a complete failure. Failures of EL emitters 15 around the edges of an EL device 1 can be less objectionable to users than failures of EL emitters 15 near the center of an EL device 1, so remote monitoring system 22 can refrain from reporting that EL device 1 has failed if only EL emitters 15 near the edges have failed. Decoding schemes to map two 1-D datasets (individual row and column data) to a 2-D dataset (pairs of (row,column) corresponding to a failed EL emitter 15) can be determined by those skilled in the keypad and touchscreen art (see e.g. U.S. Patent Application Publication No. 2008/0158178 to Hotelling et al.).

A wide variety of configurations of EL emitters 15 can be employed with the present invention. In various embodiments, EL emitters 15 can be designed specifically for use with the present invention. The shape and layout of EL emitters 15 on substrate 10 can be selected as can be determined by those skilled in the art to provide a desired overlap between light cones from adjacent EL emitters 15 striking light sensor 18. For example, in embodiments with only one light sensor 18, EL emitters 15 can be shorter in first direction 11A than perpendicular to first direction 11A. The short distance in first direction 11A means that the light from EL emitter 15 will fall on a relatively narrow area of light sensor 18, so crosstalk on light sensor 18 will be reduced. The long distance perpendicular to first direction 11A means the EL emitters 15 will be large and therefore emit a given amount of light with a lower current density, and thus slower degradation over time, than small emitters.

Figure 5:
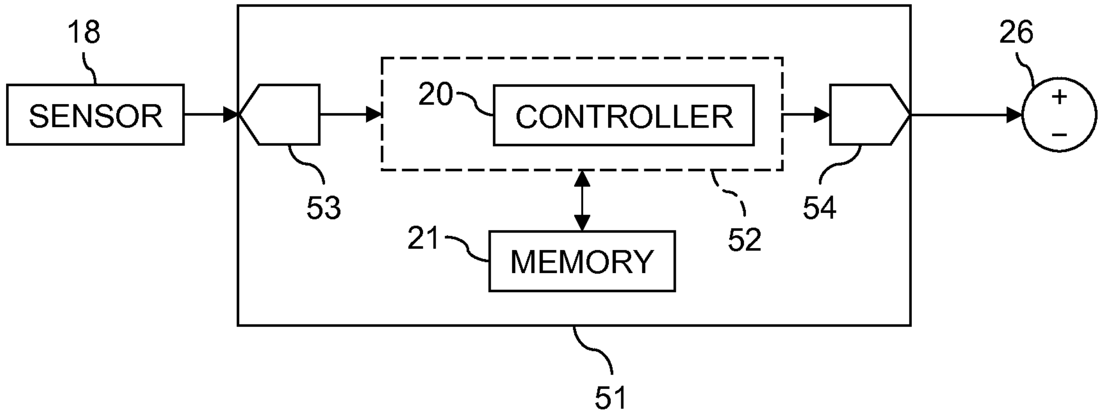
FIG. 5 is a schematic of a controller according to an embodiment.

FIG. 5 shows an embodiment of a controller implemented in a micro-controller unit (MCU) 51. MCU 51 is a system-on-chip (SoC) implementing controller 20 with software in processing core 52, which is connected to memory 21. Analog-to-digital converter 53 receives analog inputs from light sensor 18 and provides corresponding digital data to controller 20. Digital-to-analog converter 54 converts compensated digital data from controller 20 to analog data to adjust the current of power supply 26.

Processing core 52 can be an ARM or other core as known in the art. Processing core 52 and memory 21 can be connected by a bus such as AMBA or other bus as known in the art. The output of light sensor 18, and the control input of power supply 26, can be analog or digital, and be pulse-width modulated, pulse-amplitude modulated, DC modulated (either voltage or current), or encoded by other modulation schemes known in the art, and can be transmitted single-ended or differential. Memory 21 can be a nonvolatile memory, such as Flash or EEPROM, or a volatile memory, such as SRAM or DRAM. A battery backup (not shown) can be employed with a volatile memory to preserve the contents of the memory.

Many other embodiments of controller 20 can be employed with the present invention, as will be obvious to those skilled in the art. For example, controller 20 can be implemented as software in a general-purpose computer or microprocessor, as a network of interconnected logic gates on a field-programmable gate array (FPGA) or application-specific integrated circuit (ASIC), or using a programmable logic device (PLD or PAL).

Figure 6:
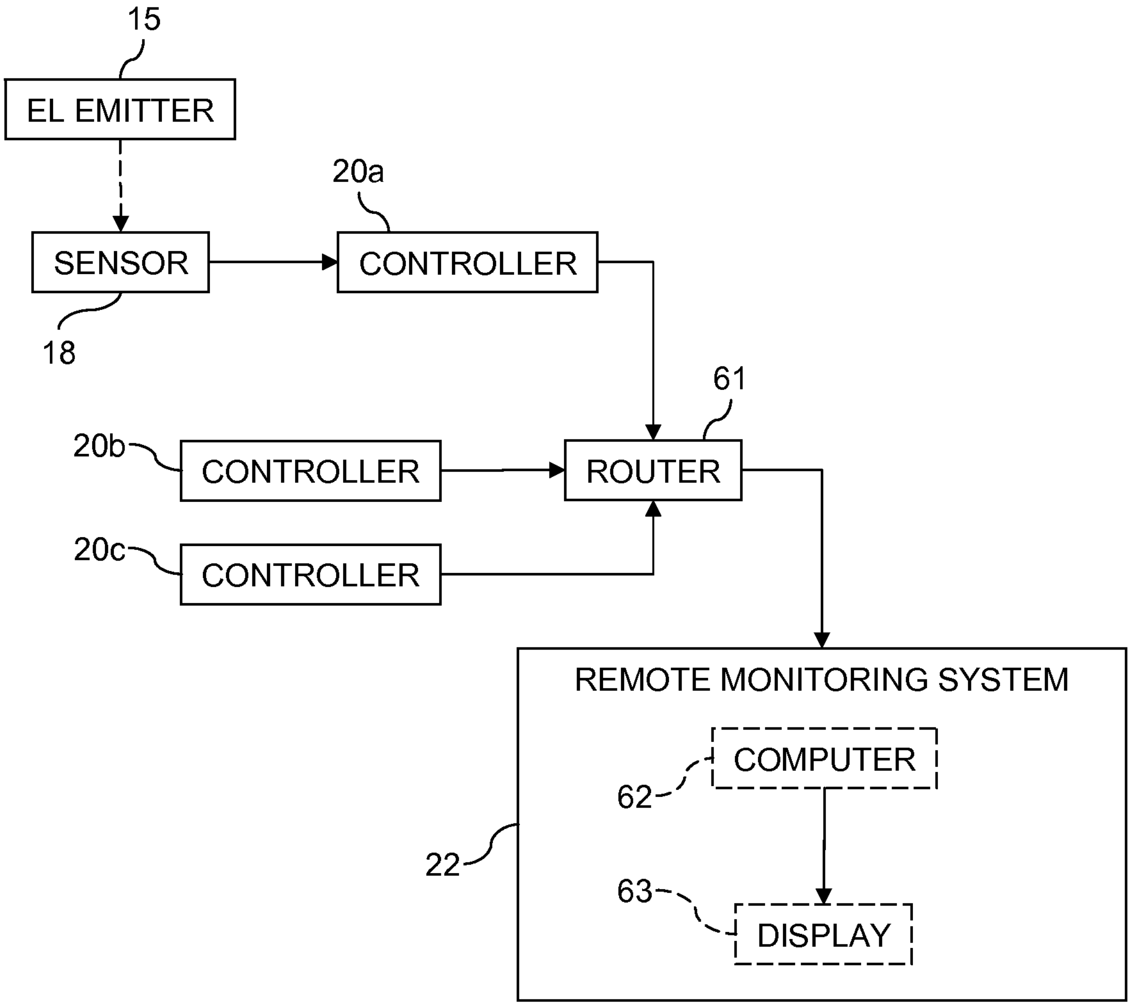
FIG. 6 is a block diagram of a remote monitoring system useful with the present invention.

FIG. 6 shows a remote monitoring system useful with the present invention. One or more controller(s) 20*a*, 20*b*, 20*c* are connected to router 61 by protocols such as DALI, LON, or others known in the art. Router 61 routes data from each controller 20*a*, 20*b*, 20*c* to remote monitoring system 22 using DALI or LON, or higher-level protocols such as TCP/IP over Ethernet. Remote monitoring system 22 includes general-purpose computer 62 running monitoring software, and display 63 for displaying to a user the outputs from the software. For example, when controller 20*a* determines that the data from light sensor 18 indicate that EL emitter 15 has failed, controller 20*a* communicates a failure notice through router 61 to remote monitoring system 22. The software on computer 62 receives the failure notice and reports it to a user on display 63 by changing a visible status indicator on display 63 from green to red. This permits the user, e.g. a building manager, to replace EL emitter 15 without having to spend time searching for the light with the failure. This is particularly useful in embodiments in multi-story buildings, in which one router 61 can be provided per story, and one remote monitoring system 22 can therefore monitor all the lights in the building. Various embodiments of remote monitoring systems include LON, DALI, CAN, EIB, X10, and various protocols running over EIA485. An example of the use of DALI is given in Simpson, Robert S.; *Lighting control: technology and applications*; Oxford: Focal Press, 2003; ISBN 0-240-51566-8 (§14.8, pp. 418-419). Many other embodiments of remote monitoring systems 22 can be used with the present invention.

The invention has been described in detail with particular reference to certain preferred embodiments thereof, but it will be understood that variations and modifications can be effected within the spirit and scope of the invention.

PARTS LIST

1 electroluminescent device
10 substrate
11 first edge
11A first direction
12 face
14 second edge
14A second direction
14B roll axis
15 EL emitter
17 emitted light
17A user light
18 light sensor
19 gap
20 controller
21 memory
22 remote monitoring system
26 power supply
31 mirror
31*a* first mirror position
31*b* second mirror position
32 actuator
33 user
48 second light sensor
49 wires
51 micro-controller unit (MCU)
52 processing core
53 analog-to-digital converter
54 digital-to-analog converter
61 router
62 computer
63 display
100 fixture
101*a*, 101*b* edge support
271*a*, 271*b*, 271*c*, 271*d*, 271*e* light ray
280 curve
281 curve
282 curve

The invention claimed is:

1. Apparatus for detecting variations in light output of an electroluminescent (EL) device, comprising:
- a) the EL device, including:
  - i) a transparent substrate having a first edge extending in a first direction, and a face; and
  - ii) a plurality of OLED emitters disposed in direct contact with the face of the transparent substrate in the first direction;
- b) a power supply for providing electric current through the OLED emitters so that they emit light, wherein some of the light emitted by each EL emitter travels through the substrate and out of the first edge;
- c) a light sensor for sensing the light travelling out of the first edge, wherein the light sensor is physically separated from the first edge; and
- d) a controller for storing first sensed light at a first time and second sensed light at a later second time and computing a variation in light output of one or more of the OLED emitters in the EL device using the stored first sensed light and second sensed light.

2. The apparatus of claim 1, wherein the light sensor is a linear CCD array or linear CMOS sensor.

3. The apparatus of claim 1, wherein the controller further receives a reading of sensed flare light at a time when no EL emitters are emitting light, and uses the reading of sensed flare light to correct for stray light striking the light sensor.

4. The apparatus of claim 1, further including a fixture for holding the substrate and the light sensor in place with respect to each other, wherein the sensor is permanently attached to the fixture and the substrate is removably attached to the fixture.

5. The apparatus of claim 1, further including a remote monitoring system, wherein the controller communicates the computed variation to the remote monitoring system.

6. The apparatus of claim 1, further including a mirror for reflecting the light travelling out of the first edge towards the light sensor to be sensed.

7. The apparatus of claim 1, wherein the controller further adjusts the current provided by the power supply to compensate for the computed variations in light output.

8. The apparatus of claim 7, wherein the controller compensates for aging of one or more of the EL emitters by adjusting the current provided by the power supply.

9. Apparatus for detecting variations in light output of an electroluminescent (EL) device, comprising:
- a) the EL device, including:
  - a transparent substrate having a first edge extending in a first direction, and a face; and
  - ii) a plurality of EL emitters disposed over the face of the substrate in the first direction;
- b) a power supply for providing electric current through the EL emitters so that they emit light, wherein some of the light emitted by each EL emitter travels through the substrate and out of the first edge;

c) a light sensor for sensing the light travelling out of the first edge, wherein the light sensor is physically separated from the first edge;

d) a controller for storing first sensed light at a first time and second sensed light at a later second time and computing a variation in light output of one or more of the EL emitters in the EL device using the stored first sensed light and second sensed light;

e) the substrate further includes a second edge extending in a second direction not parallel to the first direction;

f) the plurality of EL emitters are disposed over the face of the substrate in a repeating pattern in the first direction and the second direction;

g) some of the light emitted by each EL emitter travels through the substrate and out of the second edge;

h) further including a second light sensor for sensing the light travelling out of the second edge, wherein the first and second light sensors are physically separated from the first and second edges, respectively; and i) wherein the controller stores third sensed light from the second light sensor at a third time and fourth sensed light from the second light sensor at a fourth time later than the third time and computes a variation in light output of one or more of the EL emitters in the EL device using the stored first through fourth sensed light.

* * * * *